W. V. TURNER.
SAFETY DEVICE FOR CARS.
APPLICATION FILED OCT. 24, 1914.
1,175,089.
Patented Mar. 14, 1916.
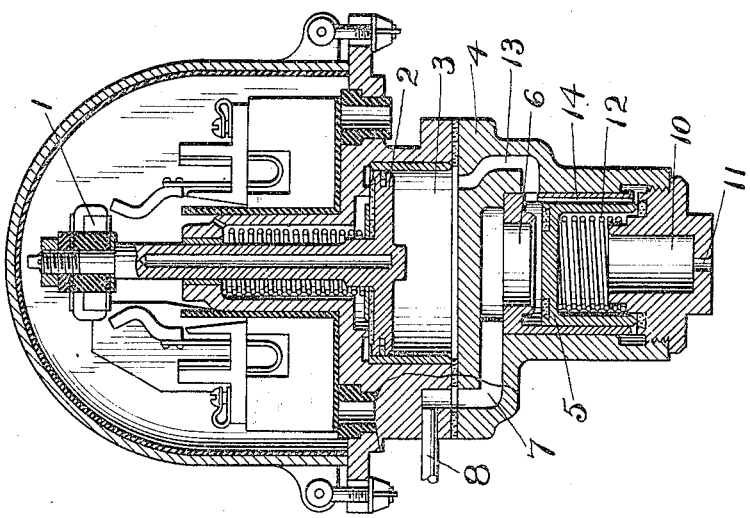
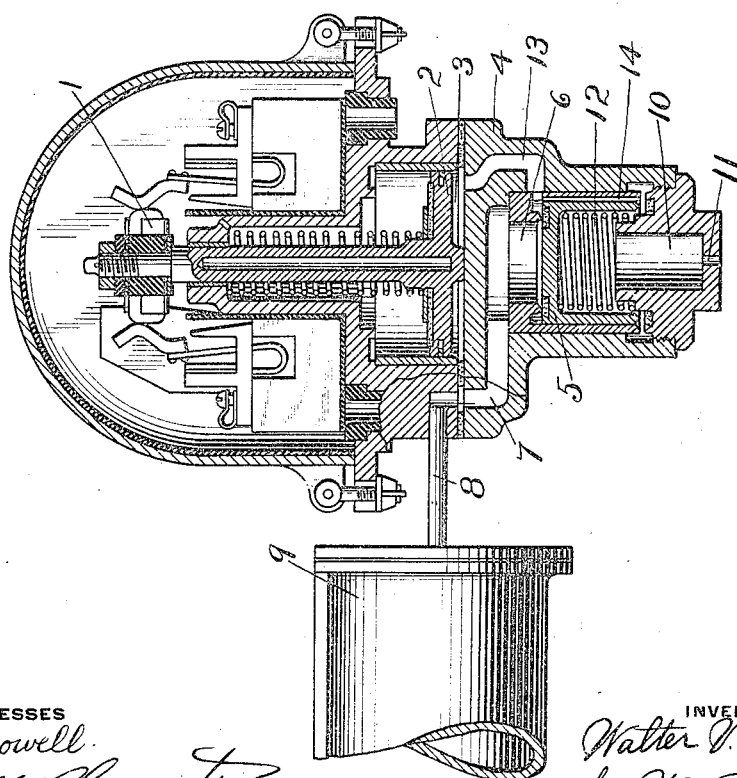
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY DEVICE FOR CARS.

1,175,089.   Specification of Letters Patent.   Patented Mar. 14, 1916.

Application filed October 24, 1914. Serial No. 868,448.

*To all whom it may concern:*

Be it known that I, WALTER V. TURNER, a citizen of the United States, residing at Edgewood, in the county of Allegheny and State of Pennsylvania, have invented new and useful Improvements in Safety Devices for Cars, of which the following is a specification.

This invention relates to electric traction systems and has for its principal object to provide improved means for preventing the starting of a car or train while the brakes remain applied.

It has heretofore been proposed to employ a switch for controlling the power circuit and a piston for operating said switch which is controlled by fluid supplied from the brake cylinder. When fluid from the brake cylinder is supplied directly to the switch piston, the flow is apt to be so gradual that a slow movement of the piston is produced which is liable to cause arcing at the switch contacts. According to my improvement, an intermediate valve device is employed which is adapted to supply and release fluid to and from the switch piston suddenly and in sufficient volume to insure the quick snap-like action of the switch.

In the accompanying drawing; Figure 1 is a sectional view of a safety device embodying my invention, showing the power switch in closed position, and Fig. 2 a similar view, showing the parts in open position.

According to my invention, a switch for controlling the power circuit and a piston 2 for operating the switch may be employed. The piston 2 is contained in a piston chamber 3 of a casing 4 and the admission and release of fluid under pressure to and from said chamber is preferably controlled by a valve piston 5 adapted to seat in opposite directions. Chamber 6 at one side of the valve piston 5 is connected by passage 7 and pipe 8 to brake cylinder 9 and chamber 10 at the opposite side is open to the atmosphere through port 11. A spring 12 acts on the valve piston 5 and tends to seat same against brake cylinder pressure.

In operation, if the brakes are applied when the car is standing, the brake cylinder pressure acting in chamber 6 on the face of valve piston 5 operates to shift same to its lower seat, so that communication is opened from chamber 6 and the brake cylinder 9, through passage 13 to piston chamber 3. The switch piston is then operated by fluid under pressure to open the switch 1 controlling the power circuit. So long as there is pressure in the brake cylinder above the tension of the spring 12 the switch 1 will remain open and consequently if the motorman attempts to start the car with the brakes applied he will be unable to do so, unless he first releases the brakes. Upon releasing the brakes, however, as soon as the brake cylinder pressure falls to a low degree, slightly less than the tension of the spring 12, which may be five pounds, for example, the valve piston 5 will be lifted by the spring to its upper seat, in which position, a restricted port 14 establishes communication from passage 13 to exhaust port 11. Fluid is thereupon vented from the switch piston chamber 3, so that the piston 2 will operate to close the switch 1. The power circuit being thus closed, the motorman can start the car in the usual manner.

The area of the valve piston 5 which is exposed in its upper seated position to brake cylinder pressure is less than the full area of the piston, so that when the brake cylinder pressure is sufficient to lift the piston from its seat against the resistance of the spring 12, an increased area of the piston is subject to brake cylinder pressure and thereby a sudden movement of the piston is effected to its opposite seat. Consequently fluid at a definite opening pressure, say eight pounds, for example, is admitted in large volume to the switch piston 2 which causes a quick snap-like movement of the piston and switch.

In releasing fluid from the brake cylinder, when the pressure falls to a degree somewhat less than the opening pressure, say five pounds, the valve piston lifts from its lower seat and thereby permits fluid under pressure to flow through port 14 to chamber 10 and the increase in pressure thus produced in the chamber assists in effecting a quick closing movement of the valve piston.

Having now described my invention, what I claim as new and desire to secure by Letters Patent, is:—

1. In an electric traction system, the combination with a switch device for controlling the current supply and piston for operating said switch, of a brake cylinder, and a valve piston operated by brake cylinder pressure supplied to one side for opening communication for supplying fluid from the brake cylinder to said switch piston to thereby operate same and open the switch, and a restricted passage for venting fluid from said switch piston to the opposite side of the valve piston in the closed position of the valve piston.

2. In an electric traction system, the combination with a switch device for controlling the current supply and a piston for operating said switch, of a brake cylinder, and a valve piston having a seated area subject to brake cylinder pressure and operated at a predetermined brake cylinder pressure to expose the full area to brake cylinder pressure and open communication for supplying fluid to the switch piston.

3. The combination with a switch device for controlling the power circuit on a car, of a brake cylinder and a valve piston for controlling the admission of fluid from the brake cylinder to said switch device, said valve piston being adapted to suddenly open communication for supplying fluid to the switch device in large volume.

In testimony whereof I have hereunto set my hand.

WALTER V. TURNER.

Witnesses:
A. M. CLEMENTS,
BARBARA HERBERT.